(No Model.)

J. C. GRIFFITH.
CAR COUPLING.

No. 596,040. Patented Dec. 21, 1897.

Witnesses
Chas. P. Heinemann.
L. W. Stockbridge.

Inventor
Jesse C. Griffith.
By John Wedderburn
Attorney

UNITED STATES PATENT OFFICE.

JESSE C. GRIFFITH, OF MADISON, NORTH CAROLINA.

CAR-COUPLING.

SPECIFICATION forming part of Letters Patent No. 596,040, dated December 21, 1897.

Application filed June 1, 1897. Serial No. 638,839. (No model.)

*To all whom it may concern:*

Be it known that I, JESSE C. GRIFFITH, of Madison, in the county of Rockingham and State of North Carolina, have invented certain new and useful Improvements in Car-Couplers; and I do hereby declare the following to be a full, clear, and exact description of the invention, such as will enable others skilled in the art to which it appertains to make and use the same.

This invention relates to improvements in car-couplers, and has special reference to that class of car-couplers known as the "Janney" couplers.

The object of the invention is to so construct a coupler that should the draw-head become detached from the car the coupler would not fall to the ground and thereby cause accident by derailing the train.

The invention consists in the novel features of construction hereinafter fully described, claimed, and illustrated by the accompanying drawings, in which—

Figure 1:
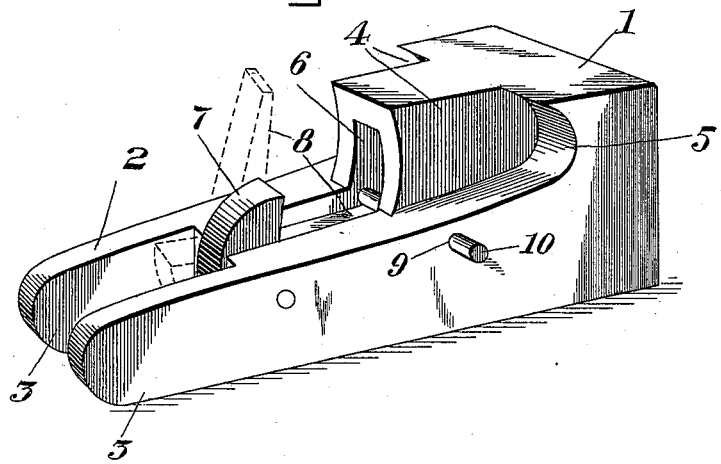
Figure 2:
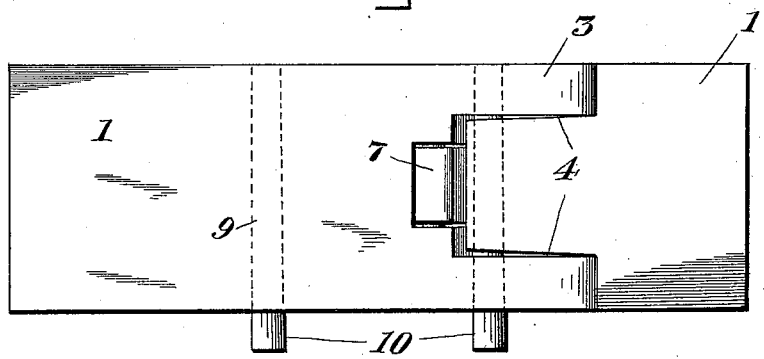
Figure 3:
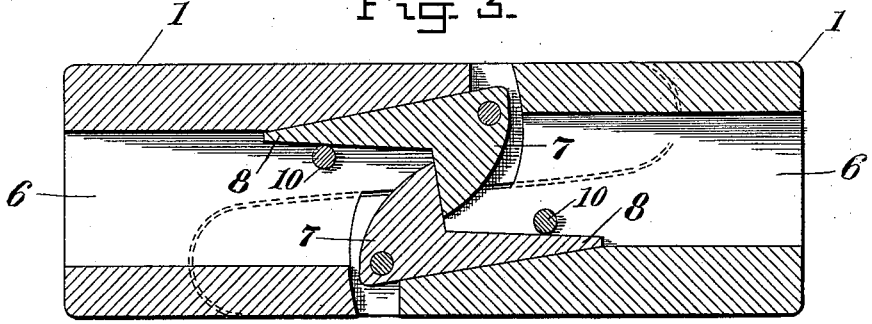

Figure 1 is a perspective view of the draw-head constructed in accordance with my invention. Fig. 2 is a top plan view of two of the draw-heads coupled together. Fig. 3 is a longitudinal sectional view of the same.

Referring to the accompanying drawings, 1 indicates the draw-head, which is reduced at its forward end, as illustrated at 2, and slotted to form the arms 3. The upper surface of these arms and the upper surface of the reduced portion curve upwardly, and formed on opposite sides of the rear portion of the draw-head are the cavities or recesses 4, which are open at their upper ends and have their bottom walls curved upwardly, said walls forming a continuation of the upper surface of the arms and cut-away portions and terminate in the rounded end walls 5. The draw-head is provided with the longitudinally-extending cavity or passage 6, which has its bottom wall inclined downwardly and opens through the forward portion 2. Pivoted within the forward end of this passage, within the reduced portion, is a coupling-hook 7, which is pivoted eccentric to the bottom wall of said passage and is provided with a stem 8. A perforation 9 is formed transverse the passage and just above the stem of the hook when the same is resting upon the bottom wall of the passage, and a pin 10 is adapted to be inserted through this perforation for holding the coupling-hook when the cars are coupled. The draw-head on the opposite car has its arms and reduced portion formed oppositely to the one just described, so that when the heads are brought together the arms of one head will rest upon the arms of the other, the rounded ends of said arms engaging the rounded end walls of the cavities or recesses 4.

When it is desired to uncouple the cars, pin 10 is withdrawn from one of the draw-heads, when the cars may be separated, the stem of the coupling-hook being raised to the position shown in dotted lines in Fig. 1. When it is desired to couple the cars, the draw-heads are brought together, said coupling-hook being moved backwardly until its stem rests upon the inclined wall of the passage, which draws its hook end into engagement with the hook of the opposite draw-head and the pin 10 is inserted, which secures the stem of the coupling-hook and prevents the separation of the draw-heads. Thus it will be seen that should the draw-head be separated from the draw-bar it will be supported by the draw-head of the adjacent car and prevent its falling to the ground, where it is liable to cause accident by derailing the train.

Having thus fully described my invention, what I claim, and desire to secure by Letters Patent, is—

1. A draw-head having its forward end reduced, arms formed on said reduced portion, the enlarged portion of the draw-head having cavities formed in its sides, whose bottom walls are a continuation of the upper surface of the arms and reduced portion, said draw-head being formed with a longitudinal passage, a coupler-hook pivoted within said passage, and a pin adapted to be inserted transverse said draw-head to hold the hook in the proper position, to prevent the cars from becoming uncoupled, substantially as set forth.

2. A car-coupler comprising a head having its forward portion reduced, arms projecting from said reduced portion, cavities or recesses formed in the sides of the enlarged portion of the draw-head, the upper surface of the arms and reduced portion, and the bottom walls of the cavity being inclined, and forming a continuation of each other, said draw-head formed with a longitudinal passage, a coupler-hook pivoted in the forward end of said passage and eccentrically thereto, said hook being formed with a stem portion, and means for holding said hook in the proper position to hold the cars coupled, substantially as set forth.

In testimony whereof I have signed this specification in the presence of two subscribing witnesses.

JESSE C. GRIFFITH.

Witnesses:
S. F. SPILMAN,
C. B. PRATT.